(No Model.) 2 Sheets—Sheet 1.

A. J. KERN.
CULTIVATOR.

No. 421,726. Patented Feb. 18, 1890.

Witnesses
M. Fowler
Wm. Bagger

Inventor
A. J. Kern
By his Attorneys,
C. A. Snow & Co.

(No Model.) 2 Sheets—Sheet 2.

A. J. KERN.
CULTIVATOR.

No. 421,726. Patented Feb. 18, 1890.

Witnesses
M. Fowler
Wm. Bagger

Inventor
A. J. Kern
By his Attorneys,
C. A. Snow & Co.

UNITED STATES PATENT OFFICE.

AMIAH J. KERN, OF BELLEVUE, OHIO.

CULTIVATOR.

SPECIFICATION forming part of Letters Patent No. 421,726, dated February 18, 1890.

Application filed August 31, 1889. Serial No. 322,600. (No model.)

*To all whom it may concern:*

Be it known that I, AMIAH J. KERN, a citizen of the United States, residing at Bellevue, in the county of Sandusky and State of Ohio, have invented a new and useful Cultivator, of which the following is a specification.

This invention relates to cultivators; and it has for its object to provide a cultivator of ordinary construction with an attachment which shall serve for the purpose of breaking and pulverizing the soil and leveling the same, so as to avoid leaving the roots of the young and tender shoots uncovered, as is frequently done by the use of cultivators of ordinary description.

The invention consists in the improved construction of the said cultivator attachment, which will be hereinafter fully described, and particularly pointed out in the claims.

Figure 1:
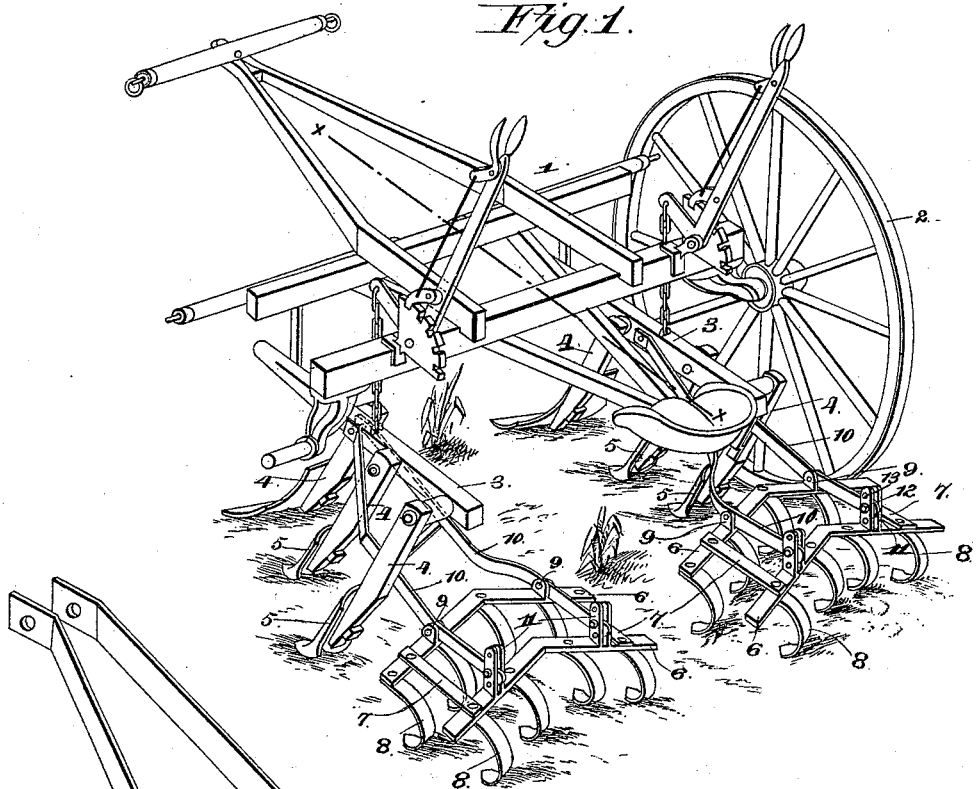
Figure 2:
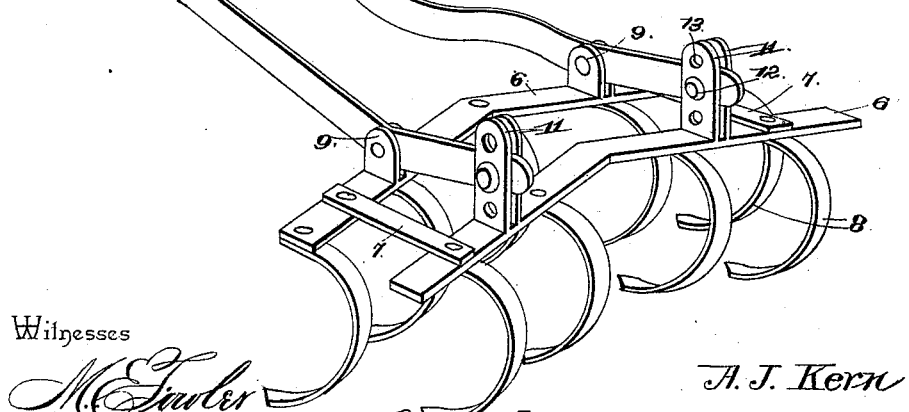
Figure 3:
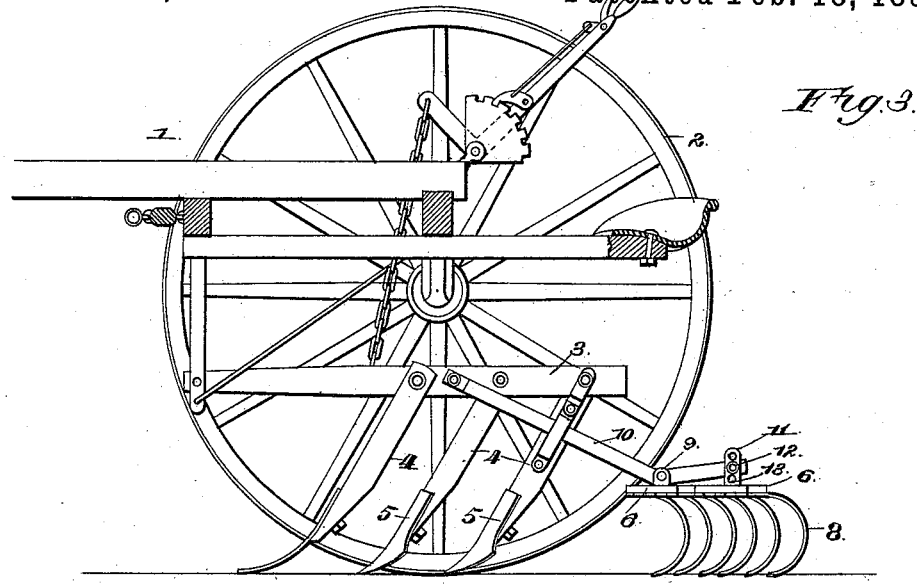
Figure 4:
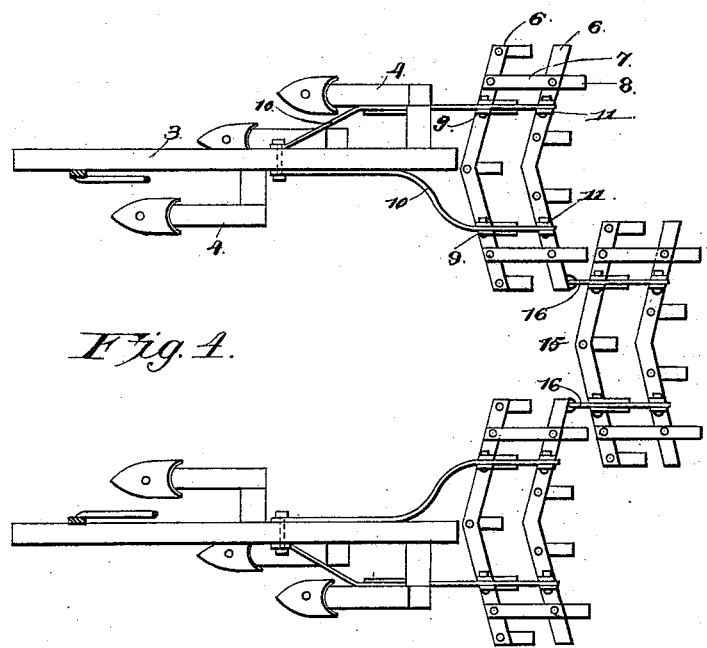

In the drawings hereto annexed, Figure 1 is a perspective rear view of the cultivator equipped with my attachment. Fig. 2 is a perspective view of one section of the attachment removed from the cultivator. Fig. 3 is a longitudinal vertical sectional view taken on the line $x$ $x$ in Fig. 1. Fig. 4 is a top view showing the cultivator provided with my improved harrow attachments to the sides and center.

Like numerals of reference indicate like parts in all the figures.

1 designates a cultivator of ordinary construction, which is mounted upon the supporting-wheels 2 2, and to which the cultivator-beams 3 3 are suitably attached in the ordinary manner in such a manner that they may be adjusted vertically as occasion may require. The cultivator-beams have the downwardly-extending standards 4, carrying the shovels 5, all of which are of ordinary construction, and for which no novelty is herein claimed.

My improved attachment, which may be called a "harrow" or "leveler," comprises a pair of transverse bars 6 6, which may be either straight or angular, the latter form being shown in the drawings, and which are connected by longitudinal braces 7 7. To the transverse bars 6 6 are secured the downwardly-extending teeth 8, which may either be ordinary square spike-teeth or spring-teeth of suitable construction. In the drawings hereto annexed spring-teeth have been shown. The said teeth, of which any desired number may be used, are preferably so arranged as to break joints. The front bar 6 of each harrow-section is provided with oppositely-extending ears or lugs 9, between which are hinged the forwardly-extending draft-bars 10 10, which are bent into suitable shape for attaching to the cultivator-beams. The rear ends of the said draft-bars extend between lugs 11 11 upon the rear bar 6 of the harrow-section, and are connected adjustably to the said lugs 11 by means of the transverse keys or pins 12. The lugs 11 are each provided with a series of perforations 13 for the passage of said key or pin, and it will thus be seen that the harrow-section may be quickly and conveniently adjusted to any desired angle with relation to the draft-bars.

The operation of this invention will be readily understood. The draft-bars of each harrow-section (which are made right and left handed) are connected by means of transverse bolts to the cultivator-beams in such a manner that the harrow-sections shall be dragged in rear of the cultivator. The cultivator as it passes over the soil leaves the latter in furrows, which frequently uncovers the roots of the young plants, and which also frequently, when the soil is dry and caked, leaves large clods behind. By my improved harrow attachment the soil is completely leveled and pulverized and the roots of the grown plants are thoroughly covered and protected.

When the cultivator is to be used for the purpose of breaking fallow soil, and when for this purpose a central shovel is used in addition to those attached to the beams 3, I employ in connection with the cultivator a central or third harrow-section 15, constructed like the two sections already described, and which is connected by means of hooks 16 with the rear bars 6 of the two side sections. The device when thus used forms a very complete and effective leveler and pulverizer.

My improved harrow attachment is, as will be seen from the foregoing, exceedingly simple in construction, and it may at a small expense be applied to any ordinary cultivator.

Having thus described my invention, what I claim, and desire to secure by Letters Patent, is—

1. A harrow and leveling device comprising the transverse bars, the braces connecting the same, the downwardly-extending teeth, the lugs upon the front transverse bars, the draft-bars hinged between said lugs, the lugs extending upwardly from the rear transverse bars, and having series of transverse perforations and transverse pins or keys to secure the rear ends of the draft-bars adjustably between said lugs, substantially as and for the purpose set forth.

2. In combination with the cultivator, the harrow-sections connected detachably to the beams thereof by draft-bars arranged on opposite sides of the beams, said draft-bars also forming the means for adjusting the harrow-sections by being pivoted to the front transverse bar of the harrow and adjustably connected to the rear transverse bar, as set forth.

3. The combination, with a wheel-cultivator, of the herein-described harrow and leveling device comprising the transverse bar the braces connecting the same, the downwardly-extending teeth, the lugs arranged in pairs upon the front transverse bar, the draft-bars hinged between said lugs and having converging front ends attached to opposite sides of the cultivator-beam, the lugs extending upwardly from the rear transverse bar and having series of transverse perforations and transverse pins or keys to secure the rear ends of the draft-bars adjustably between said lugs, all arranged and operating substantially as and for the purpose set forth.

In testimony that I claim the foregoing as my own I have hereto affixed my signature in presence of two witnesses.

AMIAH J. KERN.

Witnesses:
J. H. BRINKER,
CHAS. MATZ.